United States Patent [19]
Wagner

[11] Patent Number: 5,674,040
[45] Date of Patent: Oct. 7, 1997

[54] AUTOMATIC MULTISTOREY CARPARK

[76] Inventor: Jacek Wagner, Aufwiesenstrasse 5, CH-8305 Dietlikon, Switzerland

[21] Appl. No.: 403,729

[22] PCT Filed: Jul. 12, 1994

[86] PCT No.: PCT/CH94/00147

§ 371 Date: May 26, 1995

§ 102(e) Date: May 26, 1995

[87] PCT Pub. No.: WO95/02740

PCT Pub. Date: Jan. 26, 1995

[30] Foreign Application Priority Data

Jul. 15, 1993 [CH] Switzerland ................ 2127/93

[51] Int. Cl.$^6$ .................................................. E04H 6/12
[52] U.S. Cl. ................................................................ 414/263
[58] Field of Search ........................ 414/241–243, 414/259–260, 263, 234

[56] References Cited

U.S. PATENT DOCUMENTS

| | | | |
|---|---|---|---|
| 4,039,089 | 8/1977 | Kochanneck | 414/263 |
| 4,976,580 | 12/1990 | Knakrick | 414/263 X |
| 5,478,182 | 12/1995 | Hildebrand et al. | 414/263 X |

FOREIGN PATENT DOCUMENTS

| | | |
|---|---|---|
| 0306058 | 3/1989 | European Pat. Off. . |
| 0350464 | 1/1990 | European Pat. Off. ........ 414/263 |
| 3810116 | 10/1989 | Germany . |
| 1208166 | 10/1970 | United Kingdom . |
| 9116515 | 10/1991 | WIPO . |

OTHER PUBLICATIONS

Patent Abstracts of Japan, vol. 14, No. 285 (M–0987) 20 Jun. 1990 & JP,A,20 088 853 (Furukawa) 29 Mar. 1990.

*Primary Examiner*—James W. Keenan
*Attorney, Agent, or Firm*—Speckman, Pauley & Fejer

[57] ABSTRACT

A cylinder-shaped parking garage having a central inner shaft and a plurality of parking levels. Each of the parking levels has a plurality of parking spaces arranged in a radial pattern. Two car conveying devices are positioned about a central column and are rotatable about the central column.

4 Claims, 2 Drawing Sheets

AUTOMATIC MULTISTOREY CARPARK

BACKGROUND OF THE INVENTION

1. Field of the Invention

This invention relates to a cylinder-shaped parking garage having a central cylindrical inner shaft and a plurality of parking levels that have parking spaces arranged in a radial pattern.

2. Description of Prior Art

Such parking garages are known from the references D0306058 and PCT/IT91/00027. The parking garage disclosed in PCT/IT91/00027 has a rotating tower with four elevators. The elevators can move independently along the rotating tower. However, the angles between the elevators are fixed. Such parking garage has four important disadvantages.

1. If the rotating tower becomes disabled, the entire garage is blocked.

2. The throughput capability for vehicles is limited, because only one vehicle at a time can enter or exit.

3. To increase the throughput capabilities it is necessary to select a diameter of the parking garage so that the simultaneous use of all elevators is possible.

3.1 However, a large diameter does not optimally utilize the available, and usually expensive, site.

3.2 Further, simultaneous service of several vehicles is still unlikely.

4. Prescribed maintenance of the rotating tower decisively hampers the operation of the parking garage and can therefore become very expensive.

SUMMARY OF THE INVENTION

It is one object of this invention to overcome the above-described disadvantages.

This can be achieved in a parking garage of the above-mentioned type having a stationary central column disposed in the center of a cylindrical inner shaft. At least two car conveying devices are maintained about the central column, and are rotatable about the central column. Each car conveying device has an elevator-like platform that is displaceable in the vertical direction. The several car conveying devices can turn around the center axis simultaneously and to a large degree independently of each other. The only limitation is that the car conveying devices cannot pass each other. Each of the car conveying devices is provided with an elevator and drive elements. Thus, the danger that the entire parking garage is put out of service by a defect in the rotating tower is eliminated.

The throughput capability, according to one preferred embodiment of this invention, is decisively greater because it is almost always possible to use all car conveying devices simultaneously for serving vehicles, especially when the operations are assisted by a computer.

Further, the optimal adaptation of the size of the parking garage to the site is possible, and the performance of scheduled service work on the entire system is possible without problems.

BRIEF DESCRIPTION OF THE DRAWINGS

One preferred embodiment according to this invention will be explained in conjunction with the drawings, wherein.

DESCRIPTION OF PREFERRED EMBODIMENTS

Figure 1:
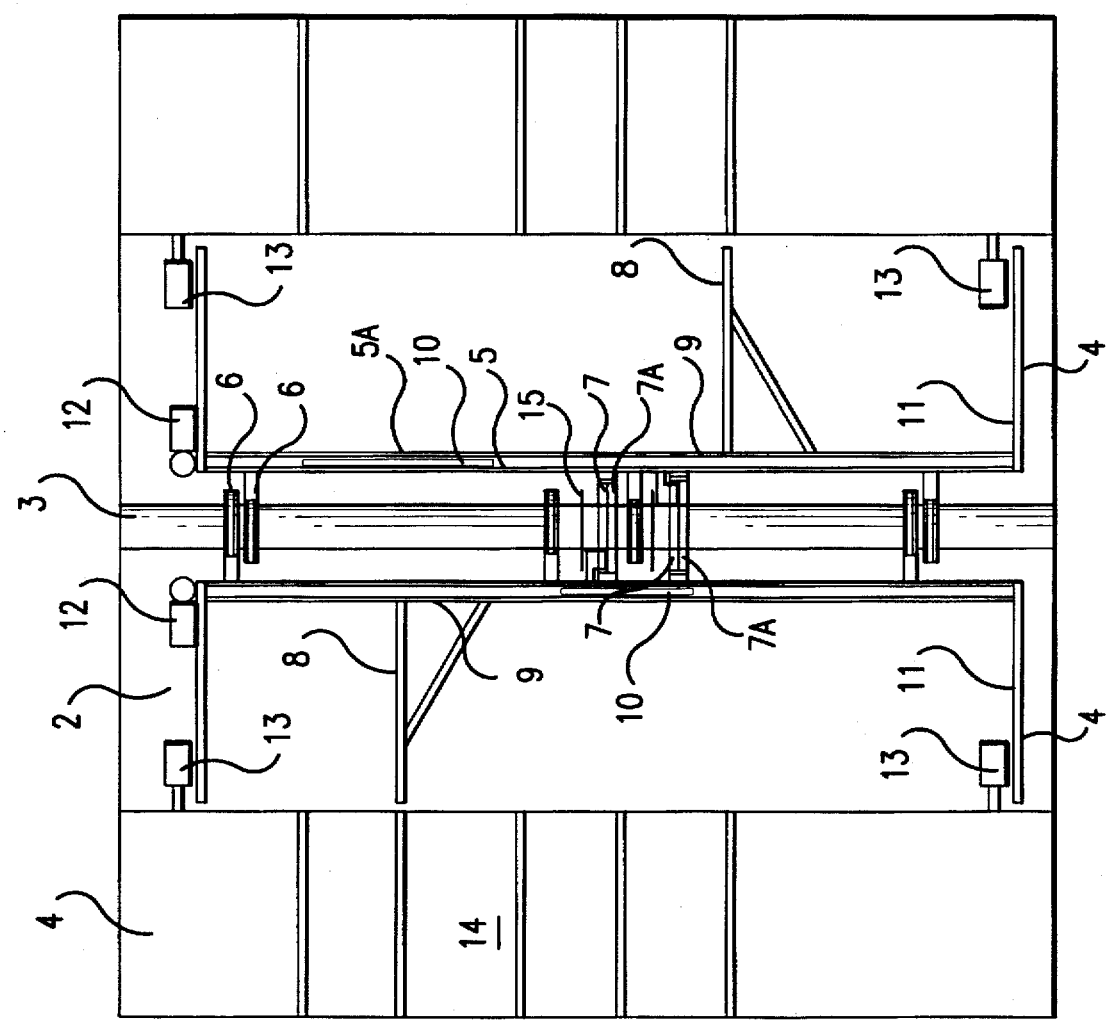
FIG. 1 shows a cross-sectional view of a parking garage with a central column and two independent car conveying devices, according to one preferred embodiment of this invention.
Figure 2:
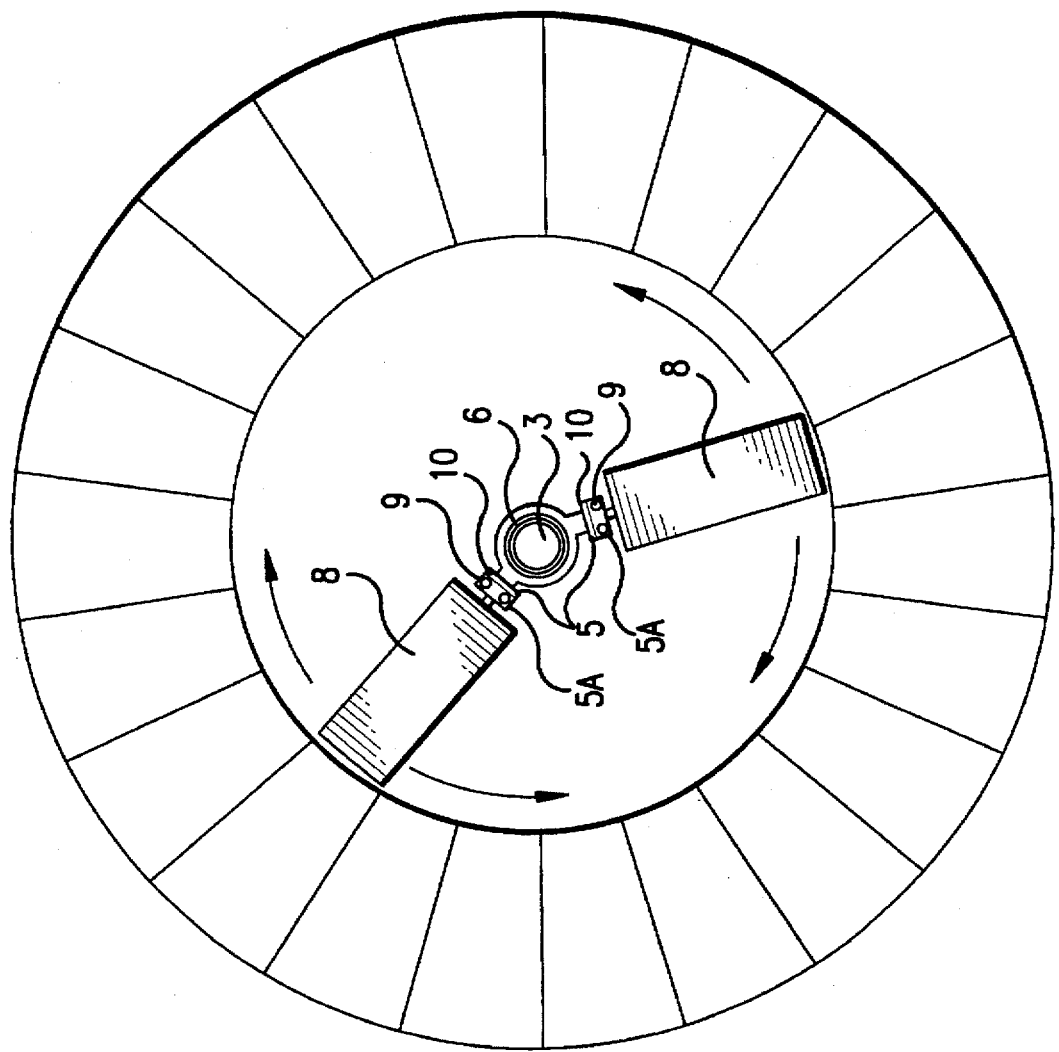
FIG. 2 shows another cross-sectional view of the parking garage with the central column and two independent car conveying devices.

One preferred embodiment of this invention for a cylinder-shaped parking garage 1 having a plurality of parking levels 14 includes four car conveying devices 4. The weight of each car conveying device 4 rests on its own axial segmental bearing 7 and the vertical orientation of the car conveying device 4 is assured by vertical segmental bearings 6. Each car conveying device 4 has its own arresting flange 15 which prevents the car conveying device 4 from jumping out of the axial segmental bearing 7. The rotary drive is provided by two servo motors 12 that are positioned on support surfaces 11 to prevent torsional stresses. The drive transmission takes place with the help of gear wheels, wherein complementary stationary gears are disposed in the inner shaft. The cars are transferred on their own wheels from and onto the elevator by the traction device. The electronic control system is assisted by a computer.

The operations in the parking garage 1 are controlled and monitored by the electronic control system.

Several car conveying devices 4 are attached to the central column 3.

The car conveying device 4 includes a main support 5 and one or a plurality of auxiliary supports 5A.

The supports 5A are aligned along the central column 3. The main support 5 is fastened by bearings 6, 7 to the central column 3 so that the entire car conveying device 4 can be rotated about the central column 3.

The weight of the car conveying device 4 is supported by an axial segmental bearing 7. The vertical orientation of the car conveying device 4 along the central column 3 is assured by vertical segmental bearings 6.

The axial segmental bearing 7 rests on a bearing base 7A positioned on the central column 3. A car conveying device 4 has an elevator-like platform 8.

The elevator guidance 9 has one or several supports. The main support 5 and the auxiliary supports 5A are arranged so that there remains sufficient space for guiding the platform counterweight 10.

The central column 3 is also the support for all mechanical and electronic auxiliary devices.

Load-support platforms 11 are attached to the upper and lower ends of the car conveying device 4. The load-support platforms 11 are the supports for the mechanical and electronic devices 13 necessary for operating the car conveying device 4.

The devices required for performing the rotating movement by the car conveying device 4 are disposed on the central column 3.

A car can be transferred to and from the platform 8 on the car's own wheels by a traction device, and the parking spaces can have arresting devices for the parked vehicles.

I claim:

1. In a cylinder-shaped parking garage (1) having a central cylindrical inner shaft (2) and a plurality of parking levels (14), each of the parking levels (14) having a plurality of parking spaces arranged in a radial pattern; and the parking garage having at least one entrance and at least one exit, the improvement comprising: one stationary central column (3)

disposed in a center of the central cylindrical inner shaft (2); at least two car conveying devices (4), positioned about the stationary central column (3) and rotatable about the stationary central column (3), the at least two car conveying devices (4) moving independently of each other, each of the at least two car conveying devices (4) comprising at least one elevator-like platform (8), the at least one elevator-like platform (8) being displaceable in a vertical direction, at least one vertically directed main support (5), said vertically directed main support (5) being aligned to said stationary central column (3) by at least one axial beating and at least one radial bearing, at least one auxiliary support (5A) forming a platform guidance (9), said platform (8) and a platform counterweight (10) slidable with respect to said platform guidance, and at least one accessory platform (11) positioned on one of the at least one main support (5) and the at least one auxiliary support (5A) of each of the at least two car conveying devices (4) at least one of above a top floor and below a ground floor.

2. In a parking garage in accordance with claim 1, further comprising an electronic control device, said electronic control device independently controlling movement of the at least two car conveying devices (4), and means for preventing collisions between the at least two independently moving car conveying devices (4).

3. In a parking garage in accordance with claim 2, wherein the stationary central column (3) is a support element for a plurality of mechanical, electronic and motor devices used to operate the cylinder-shaped parking garage (1).

4. In a parking garage in accordance with claim 1, wherein the stationary central column (3) is a support element for a plurality of mechanical, electronic and motor devices used to operate the cylinder-shaped parking garage (1).

* * * * *